United States Patent [19]

Gray et al.

[11] Patent Number: 5,286,390
[45] Date of Patent: Feb. 15, 1994

[54] METHOD FOR TREATING DEINK WASTES USING MELAMINE ALDEHYDE-TYPE POLYMERS

[75] Inventors: Ross T. Gray, Coraopolis; Denis E. Hassick, Monroeville, both of Pa.

[73] Assignee: Calgon Corporation, Pittsburgh, Pa.

[21] Appl. No.: 954,637

[22] Filed: Sep. 30, 1992

[51] Int. Cl.$^5$ .............................................. C02F 1/56
[52] U.S. Cl. ...................................... 210/727; 162/5; 210/734; 210/735; 210/928
[58] Field of Search .................. 162/5; 210/705, 724, 210/725, 727, 728, 734, 735, 928

[56] References Cited

U.S. PATENT DOCUMENTS

| | | | |
|---|---|---|---|
| 3,377,274 | 4/1968 | Burke et al. | 210/736 |
| 3,835,045 | 9/1974 | Hussissian | 210/709 |
| 3,868,320 | 2/1975 | Presley | 210/727 |
| 4,043,908 | 8/1977 | Roberts et al. | 210/724 |
| 4,655,059 | 4/1987 | Mizuno et al. | 210/735 |
| 4,784,776 | 11/1988 | Mangravite | 210/735 |
| 4,835,206 | 5/1989 | Farrar et al. | 210/735 |
| 5,013,456 | 5/1991 | St. John et al. | 210/734 |

FOREIGN PATENT DOCUMENTS

| | | |
|---|---|---|
| 1114079 | 12/1981 | Canada . |
| 293129 | 11/1988 | European Pat. Off. . |
| 59-177190 | 10/1984 | Japan ................................. 210/735 |

OTHER PUBLICATIONS

G. A. Smook, "Handbook for Pulp and Paper Technologists", 7th Edition (1989) pp. 196-201.

*Primary Examiner*—Peter A. Hruskoci
*Attorney, Agent, or Firm*—William C. Mitchell; C. M. Caruso

[57] ABSTRACT

A method for treating an ink-laden wastewater stream comprising adding an effective amount of a melamine-aldehyde polymer to the ink laden stream being treated and segregating at least some portion of the resulting ink-laden agglomerated solids from the treated water.

2 Claims, No Drawings

METHOD FOR TREATING DEINK WASTES USING MELAMINE ALDEHYDE-TYPE POLYMERS

BACKGROUND OF THE DISCLOSURE

This invention relates to a method for treating ink-laden waste water produced from secondary fiber deinking operations. Recycling involves the repulping of used paper to separate the fibers from one another and from the ink, followed by the removal of ink and other extraneous materials from the repulped stock. Various combinations of washing, flotation, and cleaning steps have been used to accomplish this separation. See, for example G. A. Smook, "Handbook for Pulp and Paper Technologists", 7th Edition (1989) pgs. 196 to 201. Additionally, deinking operations utilize various surfactants, along with agents such as caustic soda, silicates and borax to separate ink particles from fiber and to disperse the ink particles in the washing bath. When ink is removed from the paper fibers, ink and surfactant-laden wastewater is produced. It is vital to be able to capture the ink solids from this wastewater prior to discharge.

The wastewater problem has not been adequately solved in the past. Though triazine/aldehyde polymers have many industrial applications, for example in water treatment, paper fiber recovery, decoloration, and in the treatment of the circulating waters of paint spray booths, the use of such polymers in the treatment of wastewater streams generated by deinking operations is not known or suggested in the art.

Canadian Pat. No. 1, 114,079 discloses the use of melamine aldehyde acid colloids in the clarification of water suspensions of finely divided solids, including raw water, raw sewage, and industrial process and wastewaters such as those generated in the coal mining, ore processing and chemical manufacturing industries. The use of these colloids to treat ink-laden wastewater from secondary fiber deinking operations is not disclosed or suggested by this reference.

Copending application U.S. Ser. No. 858,817 relates to the use of a pH-adjustment step in combination with the inorganic and organic coagulants to treat wastewater from a deinking operation.

U.S. Pat. No. 4,656,059 to Mizuno et al relates to the use of melamine-aldehyde acid colloid solutions for treating over sprayed paint captured in spray booths, and U.S. Pat. No. 4,629,572 to Leitz et al relates to the use of urea or amino triazine-aldehyde condensation reaction products in combination with water-swellable clays to treat paint spray booth waters.

Additionally, EP 293129 discloses a method employing melamine aldehyde-type polymers in conjunction with alkalinity sources and flocculant polymers to detackify solvent-based coatings captured in paint spray booth systems. Copending and commonly assigned U.S. patent application Ser. No. 475,670 discloses additional methods for removing solids from water-based paint systems using melamine-aldehyde polymers, and copending and commonly assigned U.S. patent application Ser. No. 588,997 discloses the use of such polymers to treat oversprayed water and solvent-based paint. U.S. Pat. No. 5,068,279 discloses further methods for detackification of paint spray systems using formaldehyde-scavenged melamine formaldehyde polymers. None of these references disclose or suggest the use of melamine aldehyde polymers to treat wastewater generated from a secondary fiber deinking operation.

SUMMARY OF THE INVENTION

The instant invention relates to a method for treating ink-laden wastewater produced from a deinking operation which comprises adding an effective amount of a melamine aldehyde-type polymer to an ink-laden wastewater stream containing dispersed ink, deinking chemicals such as surfactants and/or caustic and paper fibers, thereby causing the coagulation of ink and/or fiber particles. These ink-laden solids are then separated, resulting in water of high clarity.

With the current emphasis on recycling paper, there has also been a growth in the deinking of newsprint and other recycle stock. Conventional deinking processes, which utilize chemicals such as caustic soda and surfactants, generate wastewater slurries containing pulp solids, fillers, ink, surfactants and other chemicals. As used herein, such waters are referred to as ink-laden wastewater slurries or streams. Though attempts have been made to treat such ink-laden wastewater slurries and to separate ink laden solids from these wastes, widely successful treatment processes are not known in this area.

As used herein, the term "ink" refers to any non-water soluble printing ink removed from recycled paper in a secondary fiber deinking operation, the term "coagulant" refers to an agent which causes the agglomeration or precipitation of ink-laden solids, usually by charge neutralization, from deink wastewater streams, and the term "flocculant" refers to an agent that combines such solids into larger agglomerates or "flocs" which are more amenable to segregation from aqueous systems.

The instant inventor has discovered a treatment method for ink-laden wastewater slurries or streams produced as by-products of deinking operations which generally provides excellent solids/liquid separation, a clarified, decolorized water and highly flocculated solids which are easily handled. The flocculated solids are ideal for separation by gravity thickening and dewatering by belt press filtration. This process involves addition of a melamine aldehyde-type polymer to an ink-laden wastewater stream generated from a secondary fiber deinking process and segregation of the resulting floc from the water being treated. While various polymers have been used to treat ink-laden waste water streams, the use of melamine aldehyde polymers in such operations is believed to be novel.

DETAILED DESCRIPTION OF THE INVENTION

The instant invention is directed to a method for treating an ink-laden wastewater slurry or stream comprising water and ink-laden waste solids, particularly a wastewater stream generated in a secondary fiber deinking operation, wherein a non-water soluble printing ink is removed from cellulosic fibers, which comprises: adding an effective amount of a melamine aldehyde-type polymer to said slurry or stream and separating or segregating some portion of the resulting flocculated ink-laden solids from said water of said ink-laden wastewater slurry or stream. Preferably, an effective amount of a flocculant polymer is used to assist in the solids separation step.

The instant invention is also related to compositions comprising a) an ink-laden wastewater stream and b) at least about 0.1 ppm, based on the total weight of said ink-laden wastewater stream, of a melamine aldehyde-type polymer.

As used herein the terms "melamine aldehyde-type polymer" and "melamine polymer" are synonymous and refer to any polymer prepared from (a) melamine or a substituted melamine; and (b) a compound described by the following formula:

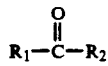

wherein $R_1$ and $R_2$, which may be the same or different, are selected from the group consisting of H and straight or branched $C_{1-4}$ alkyl groups. The preferred compounds of (b) comprise aldehydes, with methanal (formaldehyde), ethanal and propanal being especially preferred; the most preferred aldehyde is formaldehyde. Also, other triazines such as urea and/or dicyandiamide can be used to prepare the instant polymer in combination with melamine.

The mole ratio of component (a) to component (b) should range from about 1:1 to about 1:6, with the preferred ratio being from about 1:1 to 1,.3. The most preferred mole ratio is about 1 mole of melamine or a derivative thereof to about 2 to 2.5 moles of an aldehyde. Thus, the most preferred polymer is prepared from melamine and formaldehyde with the mole ratio of melamine to formaldehyde being about 1:2 to about 1:2.5.

The instant melamine polymers are insoluble in water. They are therefore best maintained in acidic solutions prior to use wherein the melamine polymer is stabilized in a fine colloidal state of suspension. Calgon's product CA-289, which has a pH of about 1.6 to about 2.1, is an example of the preferred form. This product contains 8% active melamine-formaldehyde polymer in an acidic aqueous solution. Any acid can be used to prepare the melamine aldehyde acid suspension, although hydrochloric acid is preferred. Also, other stabilizing agents, such as alcohols, can be used.

The percent by weight of active melamine polymer in a stabilized (acidic) suspension or solution should range from about 0.1% to about 20%, preferably 1% to about 15%, and most preferably about 4% to about 12%, due to cost and product stability considerations. The pH should be sufficiently low to keep the melamine aldehyde-type polymer in a fine colloidal suspension.

The molecular weight of the melamine aldehyde-type polymer is not critical. However, the preferred molecular weight ranges from about 500 to about 50,000, and the most preferred molecular weight ranges from about 500 to about 5,000. As noted above, suitable melamine aldehyde-type polymers are commercially available from Calgon Corporation, under the tradenames CA-289 and PK-9511. These products have molecular weights of about 2,200.

An effective amount of the melamine polymer should be added to or maintained in the water being treated. The melamine polymer reacts with the ink-laden impurities in an ink-laden wastewater stream to form coagulated ink-laden solids, which are then segregated to form clarified water.

Preferably, the melamine polymer dosage should be at least about 0.1 ppm, on an active basis, based on the weight of the ink-laden waste stream being treated. More preferably, the dosage should range from about 10 to about 100 mg/L, but could be even higher depending on the solids and ink loading.

The instant melamine polymers can be added to the ink-laden water being treated by any conventional method. Preferably, however, the melamine polymer is added to the ink-laden water being treated in a rapid-mix tank having high agitation. When an effective amount of a melamine polymer is used, its addition to ink-laden water generally causes formation of a distinct floc which results from the coagulating action of the polymer on the solids present in the ink laden wastewater stream. As used herein, the term "effective amount" refers to that amount of melamine polymer which achieves the desired water clarity and ink solids capture.

After addition of the melamine polymer, the agglomerated solids are separated from the water stream being treated by any conventional method. For example, rake clarifiers may be used. To assist in this separation, an effective amount of a flocculant polymer can be added. Relative to the flocculant, the term "effective amount" refers to that amount of flocculant necessary to promote the formation of a buoyant floc structure by binding the conditioned ink-laden particles and incorporating air into the floc structure. The resulting floc facilitates the removal of ink laden solids from the water being treated. The ink solids generated from co-addition of a polymeric flocculant and an acid colloid should provide desirable handling and dewatering properties.

The type of polymeric flocculant used and its molecular weight are not believed to be critical to the instant process. Suitable flocculants include cationic polymers, nonionic polymers, anionic polymers, amphoteric polymers, or mixtures thereof.

Examples of acceptable flocculants include long chain polyacrylamides and long chain polymethacrylamides; the preferred flocculants are nonionic or slightly anionic polyacrylamides having a weight average molecular weight ranging from about $6 \times 10^6$ to about $20 \times 10^6$.

Typical cationic polyelectrolytes which may be used as flocculants in the instant invention include but are not limited to polyamines, polyphosphonium compounds, polysulfonium compounds, quaternary ammonium compounds, polymers of methacryloyloxethyl trimethyl ammonium methyl sulfate (METAMS), polymers of methacrylamido propyl trimethyl ammonium chloride (MAPTAC), polymers of acryloyloxyethyl trimethyl ammonium chloride (AETAC), polymers of methacryloyloxyethyl trimethyl ammonium chloride (METAC) and polymers prepared from combinations of METAMS, MAPTAC, AETAC and/or METAC with acrylamide and/or methyacrylamide. Representative of quaternary ammonium compounds are diethyl diallyl ammonium and dimethyl diallyl ammonium polymers and salts thereof.

The preferred cationic flocculants are quaternary ammonium polymers such as polydimethyl diallyl ammonium chloride (polyDMDAAC), poly dimethyl diallyl ammonium bromide (polyDMDAAB), poly diethyl diallyl ammonium chloride (polyDEDAAB), or any of the same copolymerized with acrylamide or methacrylamide. The preferred molecular weights for the quaternary ammonium polymers are in excess of about 2,000,000.

The most preferred cationic flocculent is a polymer comprising dimethyl diallyl ammonium chloride and acrylamide, or a homologue thereof,. having a weight average molecular weight in excess of about 4,000,000.

The ratio of the nonionic moiety (for example, acrylamide or methacrylamide) to the cationic moiety should be greater than about 1:1, on an active weight basis.

Other preferred polymers comprise:-a) acrylamide or methacrylamide and b) METAMS, METAC, MAPTAC or AETAC, wherein the monomer ratio of a):b), on an active weight basis, is greater than about 1:1.

The preferred anionic polyelectrolytes possess a low charge (i.e., less than 10%) and are selected from the group consisting of polyacrylic acids and salts thereof, particularly sodium salts thereof, having a molecular weight ranging from about $2 \times 10^6$ to about $20 \times 10^6$, and polymers comprising a) acrylic acid or methacrylic acid and b) 2-acrylamido-2-methylpropylsulfonic acid and-/or 2-methacrylamido-2-methylpropylsulfonic acid, wherein the weight ratio of a):b) ranges from about 1:99 to about 99:1, preferably 10:90 to 90:10 and most preferably 75:25, and wherein the molecular weight ranges from about $2 \times 10^6$ to about $20 \times 10^6$.

High molecular weight polyampholytes can be used in the instant method. Representative examples of suitable polyampholytes include polymers comprising a) acrylic acid, methacrylic acid, 2-acrylamido-2-methylpropylsulfonic acid or 2-methacrylamido-2-methylpropylsulfonic acid, alone or in combination, and b) dimethyl diallyl ammonium chloride, dimethyl diallyl ammonium bromide, diethyl diallyl ammonium chloride or diethyl diallyl ammonium bromide, alone or in combination, wherein the weight ratio of component a) to component b) ranges from about 90:10 to about 10:90 and wherein the polyampholyte has a molecular weight in excess of about $2 \times 10^6$. The polyampholytes may also contain nonionic moieties such as acrylamide or methacrylamide.

Blends of the above listed nonionic, cationic, anionic and polyampholyte flocculants can be used, alone or in combination with amphoteric metal salts.

An effective amount of the polymeric flocculent should be added. The effective amount for a given system generally depends upon the quantity of melamine aldehyde-type-polymer present in the system being treated. Preferably, the effective flocculent dosage will range is from about 0.01 to about 150 parts (active basis) of the polymeric flocculent per part melamine aldehyde-type polymer (active basis). In this range, the use of an appropriate polymeric flocculent forms a well conditioned, easily-captured floc.

After contacting the acid colloid polymer-treated ink solids with at least one polymer flocculent, the ink laden sludge is removed from the water. This removal may be facilitated by any means known in the art, including but not limited to air flotation and filtration.

As a method exemplary of the best mode known to the inventor, an ink-laden wastewater slurry containing up to about 10% solids (on a dry weight basis) produced as a by-product of a surfactant-based deinking operation is treated with an effective amount of CA-289, an 8% active melamine formaldehyde acid colloid suspension commercially available from Calgon Corporation, Pittsburgh, Pa. The effective dosage of the melamine polymer is that which is sufficient to cause the formation of a distinct ink-laden floc in the wastewater being treated. After a floc has formed, the resulting floc is segregated and dewatered by conventional means, preferably with the use of polymer flocculant.

EXAMPLES

The following examples (1–18) further demonstrate the instant invention. They are not, however, intended to limit the invention in any way.

Test Procedure

The following procedure was used to determine the efficacy of a melamine formaldehyde acid colloid (available from Calgon Corporation as CA-289) in the treatment of ink-laden wastewater from an operating paper mill.

1. Pulp 100 g ONP(old newspaper) and 100 g OMG (old magazine) with 4000 ml $H_2O$ and 20 ml of a commercially available nonionic surfactant blend at 130° F. for 10 min. Dilute in tank to 1.8% consistency. Filter thru 40 mesh screen and dilute to 0.04 mass % solids.
2. Add 1000 ml to each of 4 square glass jars and place on gang stirrer.
3. Leaving one beaker of stock as a control (no treatment), add to the others a sufficient amount of each polymer sample in order to result in a 10 ppm active treatment level.
4. Turn on gangstirrer and mix at 100 rpm for 90 seconds, then reduce blade speed to 30 rpm for 30 seconds, then turn off.
5. Allow settling for 30 minutes, draw off 100 ml of supernatant for turbidity measurement.

The treatments were ranked on rate of floc formation, rate of settling, and supernatant turbidity.

The results are shown in Tables I and II.

In these tables, the following nomenclature is used:

Polymer A is a 25% active, 85/15 w/w acrylamide (AM)/acryloyloxyethyltrimethyl ammonium chloride (AETAC) cationic emulsion polymer (mw ~ $10 \times 10^6$).

Polymer B is a 25% active, 77/23 w/w AM/AETAC cationic emulsion polymer (mw ~ $10 \times 10^6$).

Polymer C is a 24.8% active, 90/10 w/w AM/AETAC cationic emulsion polymer (mw ~ $10 \times 10^6$).

Polymer D is a 25.4% active, 50/50 w/w AM/AETAC cationic emulsion polymer (mw ~ $10 \times 10^6$).

Polymer E is a 19.8% active high mw dimethyldiallylammonium chloride (DMDAAC) homopolymer (mw ~ 1,000,000).

Polymer F is a 39.6% active medium mw polyDMDAAC (mw ~ 600,000).

Polymer G is a 50% active high mw polyquaternary amine cationic polymer (mw ~ 400,000).

CA-289 is an 84 active melamine formaldehyde acid colloid commercially available from Calgon Corporation, Pittsburgh, Pa.

TABLE I

| Ex. No. | Product | Active Polymer Dosage (ppm) | Turbidity (NTU) | Floc. Rate (1 = best) | Settling Rate (1 = best) |
|---|---|---|---|---|---|
| 1 | Blank | 0 | 940 | 5 | 5 |
| 2 | A | 10 | 350 | 4 | 4 |
| 3 | B | 10 | 210 | 2 | 2 |
| 4 | C | 10 | 245 | 3 | 3 |
| 5 | D | 10 | 130 | 1 | 1 |
| 6 | Blank | 0 | 540 | 5 | 5 |
| 7 | E | 10 | 224 | 2 | 3 |
| 8 | F | 10 | 500 | 4 | 4 |
| 9 | G | 10 | 118 | 1 | 2 |
| 10 | CA-289 | 10 | 35 | 3 | 1 |

Examples 11-18

These examples use the procedure of the previous examples, except that the slurry was not filtered through a 40 mesh screen and the final solids concentration was 0.4 mass %.

The following treatments were used:

| | | |
|---|---|---|
| 11 | No treatment | |
| 12 | 100 ppm melamine formaldehyde acid colloid (MFAC) | |
| 13 | 100 ppm MFAC then 1 ppm of Polymer D added after 30 seconds | |
| 14 | 1 ppm Polymer D | |
| 15 | None | |
| 16 | 10 ppm MFAC | |
| 17 | 50 ppm MFAC | |
| 18 | 100 ppm MFAC | |

Results are shown in Table II.

TABLE II

| Ex. No. | | Dos. ppm | Turbidity NTU | Floc rate (1 = best) | Settling rate (1 = best) |
|---|---|---|---|---|---|
| 11 | Blank | 0 | 1055 | 4 | 4 |
| 12 | MFAC | 100 | 14.4 | 3 | 2 |
| 13 | MFAC/Polymer D | 100/1 | 41.5 | 1 | 1 |
| 14 | Polymer D | 1 | 1090 | 2 | 3 |
| 15 | Blank | 0 | 1035 | 4 | 4 |
| 16 | MFAC | 10 | 1055 | 3 | 3 |
| 17 | MFAC | 50 | 122 | 2 | 2 |
| 18 | MFAC | 100 | 140 | 1 | 1 |

What is claimed is:

1. A method for separating ink-laden solids and turbidity from an ink-laden wastewater stream produced in a secondary fiber deinking operation, which method comprises:
   a) adding to said ink-laden wastewater stream at least about 0.1 ppm, on an active basis, of a melamine formaldehyde acid colloid polymer, thereby causing formation of an ink-laden floc including said ink-laden solids and said turbidity, and b) segregating said ink-laden floc from said ink-laden wastewater stream.

2. The method of claim 1, which additionally comprises adding an effective amount of a flocculant polymer to facilitate segregation of said ink-laden floc from said ink-laden wastewater stream.

* * * * *